US011050692B2

(12) United States Patent
Mikhailov et al.

(10) Patent No.: US 11,050,692 B2
(45) Date of Patent: *Jun. 29, 2021

(54) METHOD, DEVICE AND SYSTEM FOR PROVIDING INPUT SUGGESTION

(71) Applicant: RingCentral, Inc., Belmont, CA (US)

(72) Inventors: Ilya Vladimirovich Mikhailov, Saint Petersburg (RU); Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,341

(22) Filed: Oct. 28, 2019

(65) Prior Publication Data

US 2020/0067856 A1    Feb. 27, 2020

Related U.S. Application Data

(63) Continuation of application No. 15/343,773, filed on Nov. 4, 2016, now Pat. No. 10,484,314, which is a
(Continued)

(51) Int. Cl.
| | | |
|---|---|---|
| *H04L 12/00* | (2006.01) | |
| *H04L 12/58* | (2006.01) | |
| *H04L 29/08* | (2006.01) | |

(52) U.S. Cl.
CPC ............ *H04L 51/046* (2013.01); *H04L 51/20* (2013.01); *H04L 67/18* (2013.01); *H04L 67/22* (2013.01); *H04L 67/306* (2013.01); *H04L 51/04* (2013.01)

(58) Field of Classification Search
CPC .......... H04L 51/20; H04L 67/24; H04L 67/22; H04L 51/046; H04L 51/04; H04L 67/18; H04L 67/306
(Continued)

(56) References Cited

U.S. PATENT DOCUMENTS

| | | | |
|---|---|---|---|
| 7,676,400 B1 | 3/2010 | Dillon | |
| 8,266,218 B2 * | 9/2012 | Keohane | ............. G06F 3/04817 709/206 |

(Continued)

FOREIGN PATENT DOCUMENTS

| | | | | |
|---|---|---|---|---|
| WO | WO 2012/030804 A2 | 3/2012 | | |
| WO | WO-2012173894 A2 * | 12/2012 | ............. | H04L 51/02 |
| WO | WO-2018005265 A1 * | 1/2018 | ............. | H04L 51/04 |

OTHER PUBLICATIONS

International Search Report for Application No. PCT/RU 2016/000566, dated Apr. 27, 2017, 2 pages.
(Continued)

*Primary Examiner* — Frantz Coby
(74) *Attorney, Agent, or Firm* — Finnegan, Henderson, Farabow, Garrett & Dunner, LLP

(57) ABSTRACT

A computer-implemented method for providing an input suggestion for a user is disclosed. The computer-implemented method may include identifying an intended recipient of an electronic message input by the user; identifying a location associated with the user and a time associated with the electronic message input by the user; determining the input suggestion for the user based on an input profile of the intended recipient, the location, and the time; and outputting the input suggestion via a user device associated with the user.

20 Claims, 5 Drawing Sheets

Related U.S. Application Data continuation of application No. PCT/RU2016/000566, filed on Aug. 23, 2016.

(58) Field of Classification Search
USPC .................................................. 709/206, 207
See application file for complete search history.

(56) References Cited

U.S. PATENT DOCUMENTS

| | | | |
|---|---|---|---|
| 8,407,603 | B2 | 3/2013 | Christie et al. |
| 8,589,407 | B2* | 11/2013 | Bhatia ............... G06F 16/24575 |
| | | | 707/748 |
| 8,868,566 | B2* | 10/2014 | Yanagihara .......... G06Q 10/107 |
| | | | 707/748 |
| 9,159,057 | B2* | 10/2015 | Monaco .............. G06F 16/3322 |
| 9,317,585 | B2* | 4/2016 | Heymans ............ G06F 16/3322 |
| 9,420,319 | B1 | 8/2016 | Story, Jr. et al. |
| 9,576,277 | B2 | 2/2017 | Keohane et al. |
| 9,990,611 | B2 | 6/2018 | Moore et al. |
| 10,484,314 | B2* | 11/2019 | Mikhailov ............ H04L 51/046 |
| 2011/0191337 | A1* | 8/2011 | Cort .................... H04L 67/1095 |
| | | | 707/728 |
| 2011/0302249 | A1* | 12/2011 | Orr ....................... G06Q 10/107 |
| | | | 709/206 |
| 2013/0054632 | A1* | 2/2013 | van Dijk ........... G06F 16/90324 |
| | | | 707/767 |
| 2013/0173637 | A1 | 7/2013 | Kim et al. |
| 2013/0271381 | A1 | 10/2013 | Lazaridis |
| 2013/0325945 | A1 | 12/2013 | Jayaram et al. |
| 2014/0108562 | A1* | 4/2014 | Panzer .................... H04L 51/32 |
| | | | 709/206 |
| 2014/0372250 | A1 | 12/2014 | Dugan |
| 2015/0278175 | A1 | 10/2015 | Dua et al. |
| 2016/0154570 | A1* | 6/2016 | Rosenberg .......... G06F 3/04847 |
| | | | 715/753 |
| 2016/0191448 | A1 | 6/2016 | Eck et al. |
| 2016/0217784 | A1 | 7/2016 | Gelfenbeyn et al. |
| 2017/0116385 | A1* | 4/2017 | Lauderdale .......... G06F 3/0237 |

OTHER PUBLICATIONS

Written Opinion of the International Searching Authority for International Application No. PCT/RU2016/000566, dated Apr. 27, 2017, 4 pages.

* cited by examiner

METHOD, DEVICE AND SYSTEM FOR PROVIDING INPUT SUGGESTION

CROSS-REFERENCE TO RELATED APPLICATION

This is a continuation of U.S. patent application Ser. No. 15/343,773, filed Nov. 4, 2016, which is a continuation of International Application No. PCT/RU2016/000566, filed Aug. 23, 2016, the entire contents of all of which are incorporated herein by reference.

TECHNICAL FIELD

The present disclosure relates to the field of communication devices and systems and, more particularly, methods, devices and systems for providing input suggestions.

BACKGROUND

In a electronic messaging environment, such as an instant messenger (IM) application, an EMAIL application, a text message application, or the like, a sender of an electronic message often uses different vocabulary from that used by a recipient of the electronic message. For example, slang or abbreviation of a term used by the sender of the electronic message may not be comprehensible by the recipient. Moreover, a word or phrase may be understandable when the recipient has a similar general background as the sender. For example, a technological term commonly used in a software development team may be easily appreciated by members of the development team, but the same word or phrase may not be understandable if the recipient lacks such background. As a result of the vocabulary mismatch between the sender and recipient, communications are sometimes hampered.

One option would be to provide input suggestions to the electronic message senders so as to more effectively convey the electronic message. One way to provide input suggestions to an electronic message sender is to construct a linguistic profile for the recipient based on the language choices of the recipient so as to match the sender's vocabulary with the recipient's vocabulary. However, frequently the language choices of the recipient are different in various application scenarios, and the linguistic profile does not reflect the recipient's language choices in these different application scenarios.

SUMMARY

In one disclosed embodiment, a computer-implemented method for providing an input suggestion for a user is disclosed. The computer-implemented method comprises identifying an intended recipient of an electronic message input by the user; identifying a location associated with the user and a time associated with the electronic message input by the user; determining the input suggestion for the user based on an input profile of the intended recipient, the location, and the time; and outputting the input suggestion via a user device associated with the user.

In another disclosed embodiment, a user device is disclosed. The user device comprises a display and at least one processor. The at least one processor is configured to identify an intended recipient of an electronic message input by a user, identify a location associated with the user and a time associated with the electronic message input by the user, determine the input suggestion for the user based on an input profile of the intended recipient, the location, and the time; and cause the input suggestion to be output via the user device.

In another disclosed embodiment, a non-transitory computer readable medium is disclosed. The non-transitory computer readable medium stores a set of instructions that is executable by at least one processor of a user device to cause the user device to perform a method for providing an input suggestion for a user. The method comprises identifying an intended recipient of an electronic message input by the user, identifying a location associated with the user and a time associated with the electronic message input by the user; determining the input suggestion for the user based on an input profile of the intended recipient, the location, and the time; and outputting the input suggestion via a user device associated with the user.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
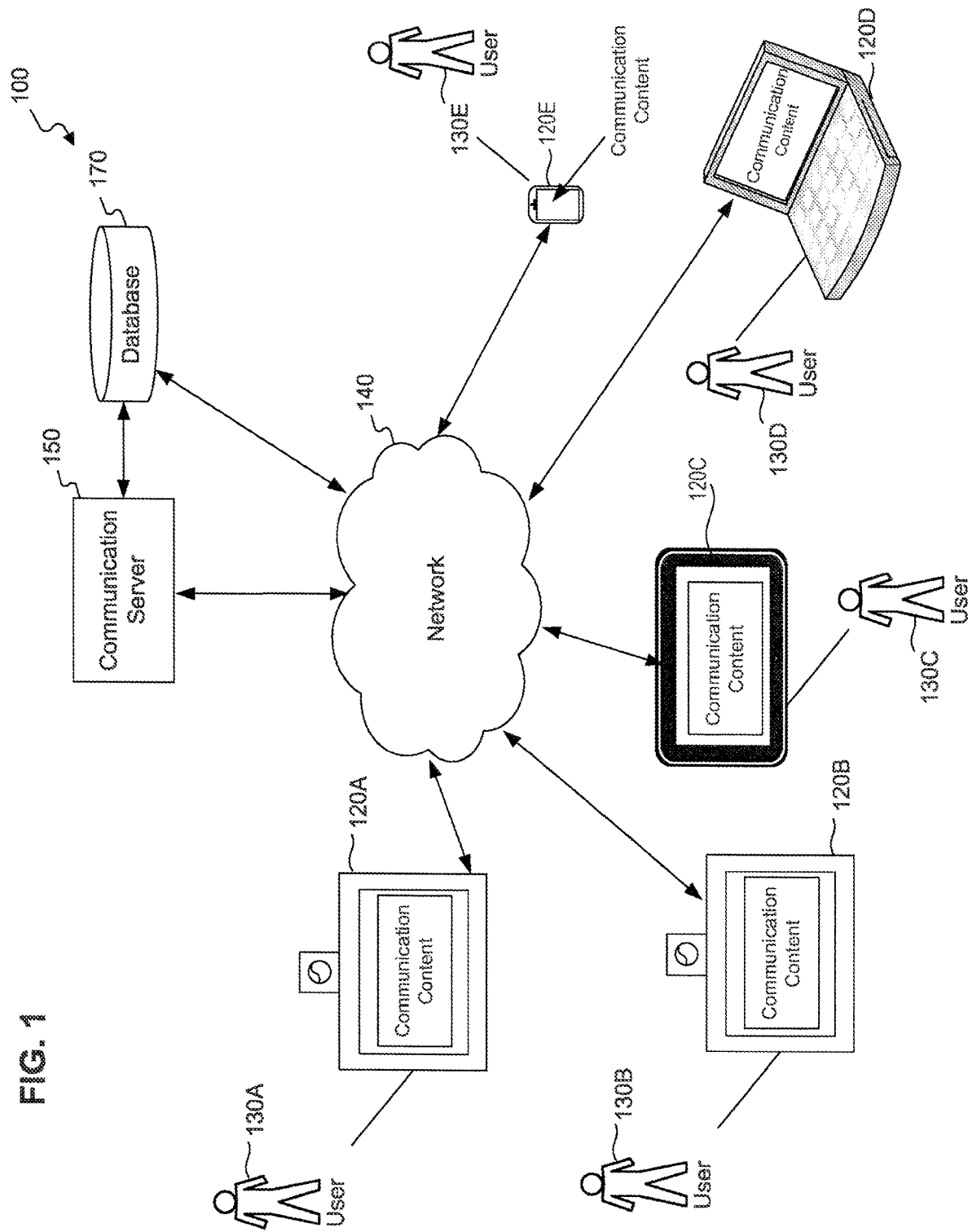
FIG. 1 is a diagram of an example of a communications system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

In a communication environment that provides electronic messaging services, such as a chat application, a text messaging application, an EMAIL application, etc., a sender of an electronic message may use different terminology or vocabulary from that used by a recipient of the electronic message, and thus certain words or phrases used by the sender in an electronic message may not be understandable by the recipient. It may be desired that input suggestions are provided with respect to terms in an electronic message to facilitate understanding of the terms by the intended recipient in various scenarios. Further, it may be desired that intelligent input suggestions are provided that take advantage of information available in the communication system, such as the time of the day the electronic message is input, the location of the electronic message sender and recipient, the communication history between the sender and recipient, etc. In the present disclosure, the term "electronic message" refers to a communication, which contains text, audio, video, data, and/or any other multimedia content, that is sent from one user to another user and delivered peer-to-peer or via a network.

Example embodiments of the present disclosure provide methods, devices and systems for providing input suggestions. Consistent with disclosed embodiments, a sender device may identify an intended recipient of an electronic message input by a sender and identify a location associated with the sender and a time associated with the electronic message input by the sender. The sender device may determine the input suggestion for the sender based on an input profile of the intended recipient, the location, and the time, and output the input suggestion via the sender device.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium." can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a communications system 100 in which various implementations as described herein may be practiced. As shown in FIG. 1, communications system 100 includes a plurality of user devices 120A-120E associated with a plurality of users 130A-130E respectively. In some embodiments, communications system 100 is, for example, a communication platform based on a chat application, a text message application, an EMAIL application, or a social network application that allows users (e.g., 130A-130E) to exchange electronic messages, documents, audio or video content, gaming, and otherwise interact with one another in real-time using associated user devices (e.g., 120A-120E). In other embodiments, communications system 100 is a collaborative environment that allows a group of participants (e.g., one or more users 130A-130E) using associated user devices (e.g., one or more user devices 120A-120E) to engage in communications, such as instant messaging (IM), chat, email, voice over IP (VoIP) phone call, audio or video conferencing, etc., as well as sharing communication content associated with the collaboration such as data files, images, audio/video content, etc.

As shown in FIG. 1, communications system 100 includes one or more user devices 120A-120E (collectively as user devices 120), a network 140, a communication server 150, and a database 170. The components and arrangements shown in FIG. 1 are not intended to limit the disclosed embodiments, as the system components used to implement the disclosed processes and features can vary.

The network 140 facilitates communications and sharing of communication content between the user devices 120 and the communication server 150. The network 140 may be any type of networks that provides communications, exchanges information, and/or facilitates the exchange of information between the communication server 150 and user devices 120. For example, the network 140 may be the Internet, a Local Area Network, a cellular network, a public switched telephone network ("PSTN"), or other suitable connection(s) that enables communications system 100 to send and receive information between the components of communications system 100. A network may support a variety of electronic messaging formats, and may further support a variety of services and applications for user devices 120.

The communication server 150 may be a system associated with a communication service provider which provides electronic messaging services to users, such as users 130A-130E. The communication server 150 may also be configured to provide other data or services, such as voice, electronic messaging, real-time audio/video, to the users. The communication server 150 may be a computer-based system including computer system components, desktop computers, workstations, tablets, hand held computing devices, memory devices, and/or internal network(s) connecting the components. The communication server 150 may be configured to receive electronic messaging information from user devices 120 over the network 140, process the electronic messaging information, store the electronic messaging information, and/or transmit electronic messaging information to the user devices 120 over the network 140. For example, the communication server 150 may be configured to analyze communication content sent by users 130A-130E and generate an input profile for each of the users, where the input profile reflects the vocabulary comprehensible by the user and/or the user's preferred choices of languages. The communication server 150 may send the input profiles to user devices 120A-120E, such that user devices 120A-120E may provide input suggestions based on the input profiles. In some implementations, the functionality of the communication server 150 described in the present disclosure is distributed among one or more of the user devices 120A-120E. For example, a part or all of the communication content delivered in the communications system 100 may be stored in one or more of the user devices 120, and one or more of the user devices 120A-120E performs functions such as analyzing the communication content to generate input profiles of the users, and providing the input profiles to other user devices.

The database 170 includes one or more physical or virtual storages coupled with the communication server 150. The database 170 is configured to store content of an ongoing communication session and/or any previously completed communication sessions. The database 170 may also be adapted to store a plurality of input profiles of the users 130 that reflect vocabularies comprehensible by the users and/or the users' preferred choices of languages. The data stored in the database 170 may be transmitted to the communication server 150 before or during an ongoing communication session. In some embodiments, the database 170 is stored in a cloud-based server (not shown) that is accessible by the communication server 150 and/or the user devices 120 through the network 140. While the database 170 is illustrated as an external device connected to the communication server 150, the database 170 may also reside within the communication server 150 as an internal component of the communication server 150.

As shown in FIG. 1, users 130A-130E communicate with one another using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as IM, text messages, EMAIL, VoIP, video conferences, with one another in a group communication environment where each user may view content posted by other users and may post content that can be accessed by other users in the communication group.

Figure 2:
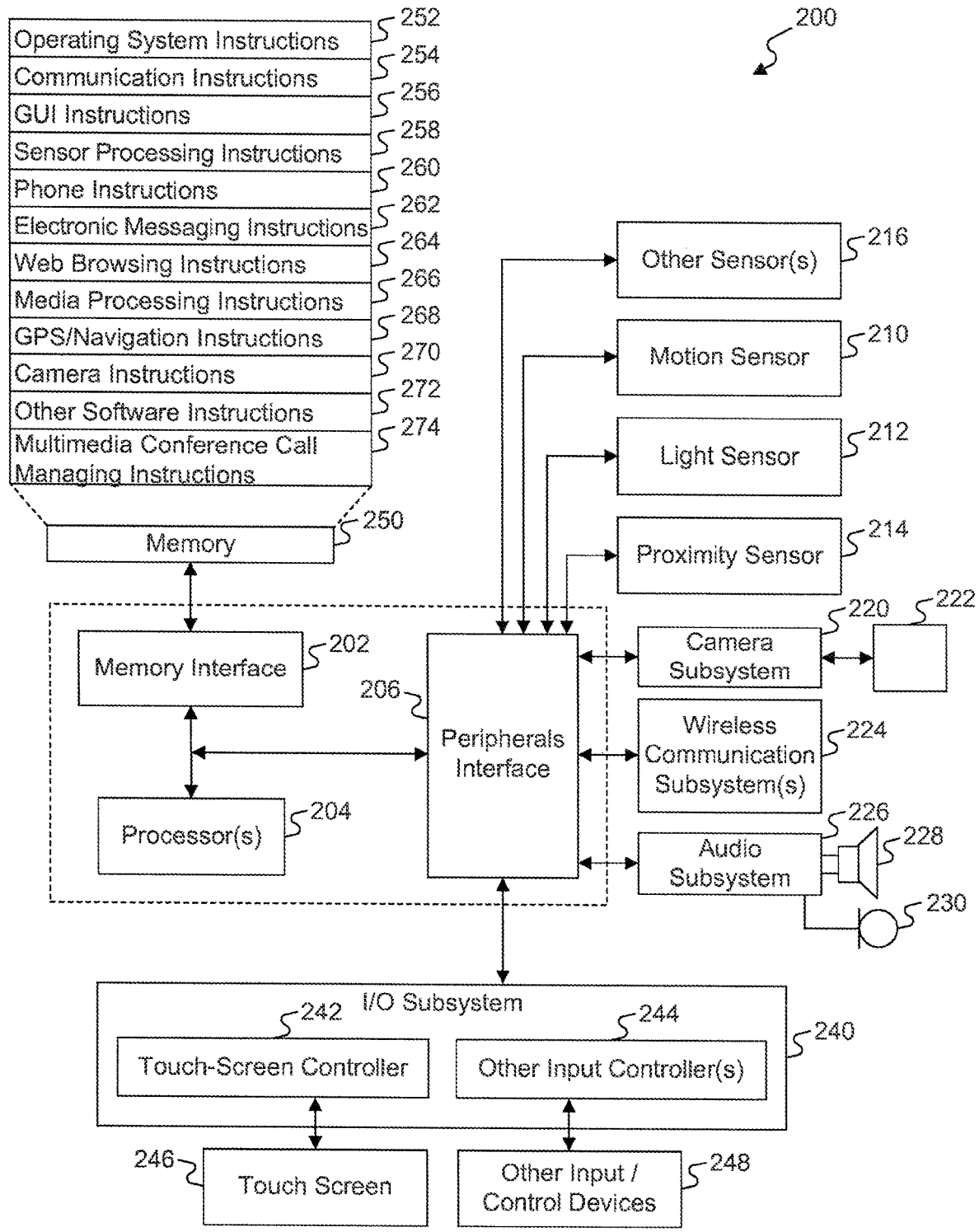
FIG. 2 is a diagram of an example user device for implementing embodiments consistent with the present disclosure.

FIG. 2 is a diagram of an example of a user device 200 for use in a communications system, such as communications system 100. The user device 200 can be used to implement computer programs, applications, methods, processes, or other software to perform embodiments described in the present disclosure, such as the user devices 120A-120E. The user device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities. A GPS receiver can be integrated with, or connected to, the user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of the wireless/wired communication subsystem 224 depends on the communication network(s) over which the user device 200 is intended to operate. For example, in some embodiments, the user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. While a touch screen 246 is shown in FIG. 2, the I/O subsystem 240 may include a display screen (e.g., CRT or LCD) in place of the touch screen 246.

The other input controller(s) 244 is coupled to other input/control devices 248, such as one or more buttons, rocker switches, thumb-wheel, infrared port, USB port, and/or a pointer device such as a stylus. The touch screen 246 can, for example, also be used to implement virtual or soft buttons and/or a keyboard.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. The memory 250 may also include multimedia conference call managing instructions 274 to facilitate conference call related processes and instructions. The memory 250 may also include recipient vocabulary profiles.

In some embodiments, the communication instructions 254 include software applications to facilitate connection with the communication server 150 that hosts an electronic messaging communication session among a plurality of users. The electronic messaging instructions 262 may include a software program to generate an input suggestion for a user inputting an electronic message on the user device. Further, the electronic messaging instructions 262 may include software applications to receive a plurality of input profiles associated with a plurality of users from the communication server 150. The graphical user interface instructions 256 may include a software program that facilitates display of the input suggestions to a user associated with the user device and facilitates the user to provide user input, and so on.

In the presently described embodiment, the instructions cause the processor 204 to perform one or more functions of the disclosed methods. For example, the instructions may cause the processor 204 to identify an intended recipient of an electronic message input by a user, identify a location associated with the user and/or a time associated with the electronic message input by the user, and/or application associated with the electronic message input and determine an input suggestion for the user based on an input profile of the intended recipient, the location associated with the user, and/or the time associated with the electronic message input by the user and/or application associated with the electronic message input. In some embodiments, other components of the communications system 100 are configured to perform one or more functions of the disclosed methods. For example, the communication server 150 may be configured to determine an input suggestion for the user and send the input suggestion to the user device associated with the user. As another example, the communication server 150 may be configured to determine an input suggestion for the user and send the input suggestion to the user device associated with the intended recipient of the electronic message.

Each of the above identified instructions and software applications may correspond to a set of instructions for performing one or more functions described above. These instructions need not be implemented as separate software programs, procedures, or modules. The memory 250 may include additional instructions or fewer instructions. Furthermore, various functions of the user device 200 may be implemented in hardware and/or in software, including in one or more signal processing and/or application specific integrated circuits.

Figure 3:
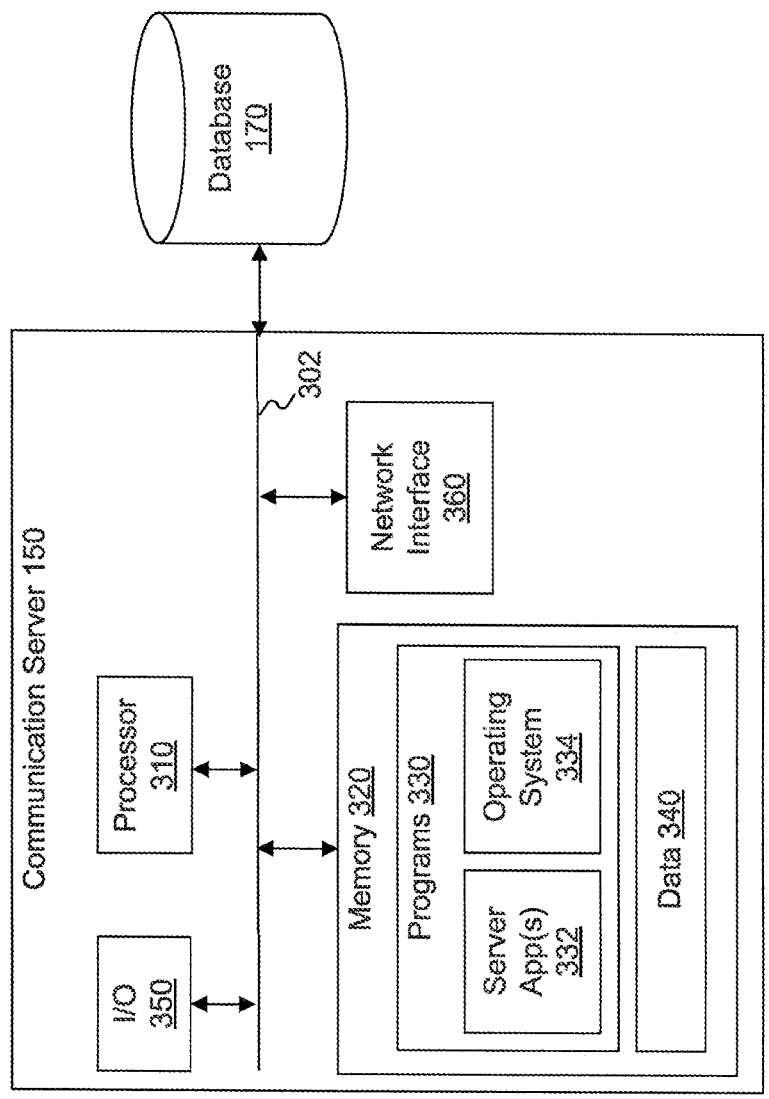
FIG. 3 is a diagram of an example communication server, consistent with the disclosed embodiments.

FIG. 3 shows a diagram of an example communication server 150, consistent with the disclosed embodiments. The communication server 150 includes a bus 302 (or other communication mechanism) which interconnects subsystems and components for transferring information within the communication server 150. As shown, the communication server 150 includes one or more processors 310, input/output ("I/O") devices 350, network interface 360 (e.g., a modem, Ethernet card, or any other interface configured to exchange data with a network), and one or more memories 320 storing programs 330 including, for example, server app(s) 332, operating system 334, and data 340, and can communicate with an external database 170 (which, for some embodiments, may be included within the communication server 150). The communication server 150 may be a single server or may be configured as a distributed computer system including multiple servers, server farms, clouds, or computers that interoperate to perform one or more of the processes and functionalities associated with the disclosed embodiments.

The processor 310 may be one or more processing devices configured to perform functions of the disclosed methods, such as a microprocessor manufactured by Intel™ or manufactured by AMD™. The processor 310 may comprise a single core or multiple core processors executing parallel processes simultaneously. For example, the processor 310 may be a single core processor configured with virtual processing technologies. In certain embodiments, the processor 310 may use logical processors to simultaneously execute and control multiple processes. The processor 310 may implement virtual machine technologies, or other technologies to provide the ability to execute, control, run, manipulate, store, etc. multiple software processes, applications, programs, etc. In some embodiments, the processor 310 may include a multiple-core processor arrangement (e.g., dual, quad core, etc.) configured to provide parallel processing functionalities to allow the communication server 150 to execute multiple processes simultaneously. It is appreciated that other types of processor arrangements could be implemented that provide for the capabilities disclosed herein.

The memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The communication server 150 may include one or more storage devices configured to store information used by processor 310 (or other components) to perform certain functions related to the disclosed embodiments. For example, the communication server 150 may include memory 320 that includes instructions to enable the processor 310 to execute one or more applications, such as server apps 332, operating system 334, and any other type of application or software known to be available on computer systems. Alternatively or additionally, the instructions, application programs, etc. may be stored in an external database 170 (which can also be internal to the communication server 150) or external storage communicatively coupled with the communication server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 320 and database 170 may include one or more memory devices that store data and instructions used to perform one or more features of the disclosed embodiments. The memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the communication server 150 may be communicatively connected to one or more remote memory devices (e.g., remote databases (not shown)) through network 140 or a different network. The remote memory devices can be configured to store information that the communication server 150 can access and/or manage. By way of example, the remote memory devices could be document management systems, Microsoft SQL database, SharePoint databases. Oracle™ databases. Sybase™ databases, or other relational databases. Systems and methods consistent with disclosed embodiments, however, are not limited to separate databases or even to the use of a database.

The programs 330 include one or more software modules configured to cause processor 310 to perform one or more functions of the disclosed embodiments. Moreover, the processor 310 may execute one or more programs located remotely from one or more components of the communications system 100. For example, the communication server 150 may access one or more remote programs that, when executed, perform functions related to disclosed embodiments.

In the presently described embodiment, server app(s) 332 causes the processor 310 to perform one or more functions of the disclosed methods. For example, the server app(s) 332 may cause the processor 310 to analyze communication content sent by a plurality of users, generate input profiles of users that reflect vocabularies capable of being understood by the users, and provide the input profiles to user devices associated with the users. In some embodiments, other components of the communications system 100 may be configured to perform one or more functions of the disclosed methods. For example, user devices 120A-120E may be configured to analyze communication content sent by a plurality of users and generate input profiles of the users that reflect vocabulary comprehensible by the users and/or language choices preferred by the users.

In some embodiments, the program(s) 330 may include the operating system 334 performing operating system functions when executed by one or more processors such as the processor 310. By way of example, the operating system 334 may include Microsoft Windows™, Unix™. Linux™, Apple™ operating systems. Personal Digital Assistant (PDA) type operating systems, such as Apple iOS, Google Android. Blackberry OS, or other types of operating systems. Accordingly, disclosed embodiments may operate and function with computer systems running any type of operating system 334. The communication server 150 may also include software that, when executed by a processor, provides communications with network 140 through the network interface 360 and/or a direct connection to one or more user devices 120A-120E.

In some embodiments, the data 340 may include, for example, input profiles of a plurality of users that reflect vocabulary comprehensible by the users and/or language choices preferred by the users. For example, the data 340 may include a wordbook for each user, where the wordbook includes a plurality of commonly used terms and corresponding user-specific terms that are comprehensible by the user.

The communication server 150 may also include one or more I/O devices 350 having one or more interfaces for receiving signals or input from devices and providing signals or output to one or more devices that allow data to be received and/or transmitted by the communication server 150. For example, the communication server 150 may include interface components for interfacing with one or more input devices, such as one or more keyboards, mouse devices, and the like, that enable the communication server 150 to receive input from an operator or administrator (not shown).

Figure 4:
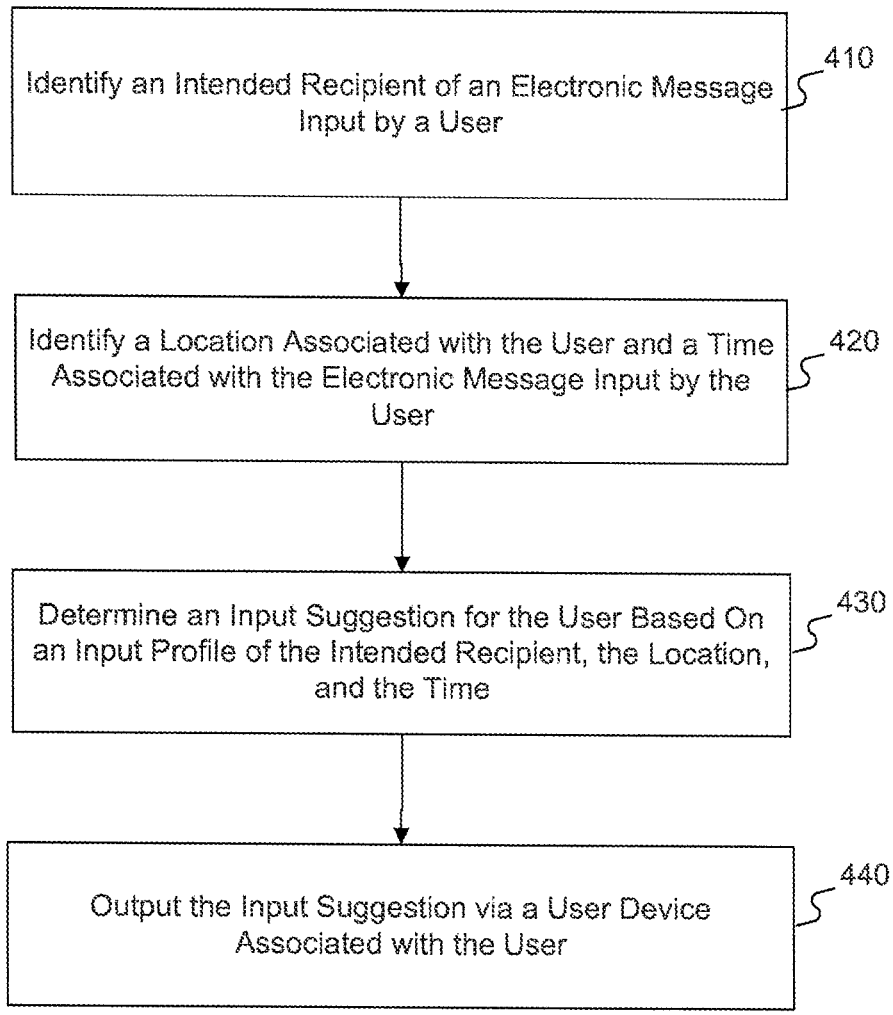
FIG. 4 is a flowchart of an example process for providing an input suggestion, in accordance with embodiments of the present disclosure.

FIG. 4 is a flowchart of an example process 400 for providing an input suggestion for a user, in accordance with embodiments of the present disclosure. The steps associated with this example process may be performed by, for example, a processor of the user device 120 of FIG. 1. The example process 400 allows the user device to provide input suggestions to a user that are relevant to the intended recipient and current communication. For example, when a user types letters "re" in a chat with a software developer, the user device may provide the word "replication" as the input suggestion, instead of "reply" or other terms commonly used in daily life.

In step 410, the user device identifies an intended recipient of an electronic message input by a user. For example, in an EMAIL application, the user device may identify the person in the "to" field of the header of the email as an intended recipient. As another example, in a chat application, the user device may identify participants in a chat session other than the user as intended recipients of the electronic message such as by using the @mention tagging. Methods known by persons skilled in the art may be used to identify the intended recipient of an electronic message without departing the scope of the present disclosure. The present disclosure does not intend to limit the manner used to identify the intended recipient of the electronic message.

In step 420, the user device identifies a location associated with the user and a time associated with the electronic message input by the user. For example, the user device may use GPS and navigation-related functions provided by the user device to obtain the user's location. The user device may identify the time associated with the electronic message input by the user by using the clock or time-related functions provided by the user device. Alternatively, the time associated with the electronic message can be resolved by a communication server or components thereof, such as the communication server 150 of FIG. 3. As another example, the user device may provide a user interface that allows the user to enter the current location or time the electronic message is being input. Otherwise, the current location and time may be determined based on an attachment to the electronic message, such as the time and location of a photograph attached or included in the electronic message. In some embodiments, the user device detects a calendar event scheduled on the user's calendar that is currently occurring and use the location described in the calendar event as the user's current location. In some embodiments, the user device may use multiple methods to detect the user's location and determine the user's location based on the combined results. The present disclosure does not intend to limit the manner used to identify the location associated with the user or to identify the time associated with the electronic message input by the user.

In step 430, the user device determines an input suggestion for the user based on an input profile of the intended recipient, the location associated with the user, and the time associated with the electronic message input by the user. For example, the user device may previously receive the input profile of the intended recipient from the communication server and store the input profile in a local memory. As another example, the user device may send a request to the communication server to retrieve the input profile of the intended recipient after identifying the intended recipient in step 410. The communication server may send the input profile of the intended recipient to the user device after receiving the request. As another example, the user device may send a request to a remote cloud server to retrieve the input profile of the intended recipient and receive the input profile of the intended recipient from the cloud server. In some implementations, the input profile may indicate a vocabulary that is capable of being understood by the intended recipient. For example, the input profile may include a wordbook that contains a plurality of commonly used terms and corresponding terms that are capable of being understood by the intended recipient. As another example, the input profile may include one or more roles associated with the intended recipient, such as a software development team member, an accountant, a member of an interest group, a middle school teacher, etc. The input profile may include the relationship between the electronic message sender and the electronic message recipient. For example, the input profile may indicate that the user and the intended recipient are co-workers, relatives, neighbors, and so on. The user device may suggest more formal languages in the input suggestion if the electronic message recipient is in a co-worker relationship with the electronic message sender, and may suggest informal languages in the input suggestion if the electronic message recipient is a family member or a personal friend of the electronic message sender. The method of generating the input profile will be described in details later in connection with FIG. 5.

While the input profile of the intended recipient may provide an indication of the vocabulary understandable by the recipient, the user device may use other information available to improve the input suggestion for the user, such as the location and the time identified in step 420. For example, if the user device previously receives an electronic message from the intended recipient, such as "where are you?", the user device may identify the user's current location and suggest a response, such as "I am at the conference room 5C." As another example, if the user device receives the electronic message "where are you?" from the user's co-worker around noon of the day, the user device may identify the user's current location, identify that it is around noon of the day, and that the electronic message sender is the user's co-worker. Correspondingly, the user device may suggest a response, such as "I am at the conference room 5C. Let's go for lunch now." As another example, if the user device receives the electronic message "where are you?" from the user's spouse at 6 pm of the day, the user device may identify that the user's current location is between the user's home and office, that it is after work hour of the day, and that the electronic message sender is the user's spouse. Correspondingly, the user device may suggest a response, such as "I'm on my way home." Thus, the user device may determine the input suggestion before the user starts typing in the body of the electronic message.

In some embodiments, the user device further identifies calendar events stored in the user device and leverages the calendar information in determining the input suggestion. For example, based on the calendar information, the user device may detect that the user is writing to one of the meeting participants shortly after the start of the meeting, and the user device may determine the input suggestion as "Will you join us?". In some implementations, the user device may identify the location of the intended recipient for determining the input suggestion. For example, the intended recipient may send his geographical location to the user device via some location sharing applications, and upon detecting that the meeting participant to whom the user is writing an electronic message is currently not in the meeting room, the user device may determine the input suggestion as "Will you join us?".

In some embodiments, the user device may identify the application in the user device that the user is currently using for writing the electronic message and take that into account in determining the input suggestion. For example, if the user is using WhatsApp Messenger to type the electronic message, the user device may determine that the electronic message is a part of a private chat conversation between the user and the intended recipient, and correspondingly may suggest informal languages in the input suggestion. As another example, if the user is using EMAIL application or Skype for Business to input the electronic message, the user device may determine that the communication between the user and the intended recipient is relatively formal, and correspondingly may suggest more formal languages in the input suggestion.

In some embodiments, the user device may identify one or more prior electronic messages received from the intended recipient and determine the input suggestion based on the prior electronic message. The input suggestion may be a word, a combination of words, or one or more complete sentences. As described in the above examples, if the user device receives a prior electronic message from the intended recipient, such as "where are you?", the user device may identify the user's current location and suggest a response based on the user's current location. In some implementations, the user device may further identify that the relationship between the user and the intended recipient and provide an estimated time for the user to arrive at a likely destination based on the calendar event on the user device. For example, the user device may further identify that the intended recipient is the user's co-worker, a meeting with the intended recipient is scheduled to start minutes ago, and it will approximately take the user 10 minutes to get to the meeting place. Correspondingly, the user device may suggest a response such as "I will be in the meeting room in about 10 minutes." As another example, if the user device receives a prior electronic message "Are you available to join lunch with us this Friday?" from the intended recipient, the user device may identify, based on the calendar event, that the user has another appointment in Friday noon time but are free other days of the week. Correspondingly, the user device may suggest a response such as "I'm not available for lunch this Friday. I can have lunch other days of this week."

In some embodiments, when multiple pieces of information are used to determine the input suggestion, the user device associates the results generated by the various pieces of information with predetermined weights. For example, the user device may determine a predetermined weight for each of the input profile of the intended recipient, the location associated with the user, the time associated with the electronic message input by the user, respectively, and the input suggestion may be determined based on the predetermined weights. The predetermined weights corresponding to each piece of information may vary depending on the application scenarios. For example, the input profile of the intended recipient may be assigned a greater weight than the location of the user when the user is initiating a new electronic message to the intended recipient, while the input profile of the intended recipient may be assigned a less weight than the location of the user when the user is replying a prior electronic message sent by the intended recipient.

In step 440, the user device outputs the input suggestion to the user. For example, the input suggestion may be displayed in a window located near the area the user is typing into, and a user interface is provided for the user to accept or reject the input suggestion. If the input suggestion is accepted by the user, the input suggestion may be inserted into the body of the electronic message. In some implementations, an indication that an input suggestion is available may be displayed, and the user may select the indication to view the input suggestion. In some implementations, no user input to accept the input suggestion is needed, and the input suggestion may be displayed in the body of the electronic message directly. As another example, the input suggestion may be output to the user via audio and/or video interfaces, and the user may accept or reject the input suggestion by making an audio input, a gesture input, or the like. The present disclosure does not intend to limit the manner the input suggestion is output via the user device.

In some implementations, when the input suggestion is accepted by the user, the user device may send the electronic message that incorporates the input suggestion to the intended recipient, as well as the original texts that are input by the user with no the input suggestion. In doing so, the recipient may view both the suggested message and the original message and may use them to learn the vocabulary of the electronic message sender. In some implementations, the user device may provide a user interface for the user to select whether to send the original message with no input suggestion to the recipient.

While a single intended recipient is described above in the example process 400, the present disclosure does not intend to limit the number of recipients in the electronic message. There may be a plurality of intended recipients for an electronic message the user is writing, and the example process 400 may be implemented similarly to provide an input suggestion. For example, the user device may provide an input suggestion based on input profiles of the plurality of recipients, a location associated with the user, and a time associated with the electronic message input by the user. In some implementations, the user device may identify a common characteristic among the input profiles of the plurality of recipients and provide an input suggestion based on the common characteristic. For example, the user device may identify that each of the intended recipients is a member of a software development team and may provide an input suggestion that contains abbreviation of technical terms commonly used in the development team. In some implementations, a menu with input suggestions for each recipient may be provided.

In some implementations, some of the steps described in the example process 400 may be implemented by a server, such as the communication server 150 of FIG. 1. For example, the user device may identify intended recipient, the location of the user, and the time the electronic message is input by the user and send the information to the server. The server may subsequently retrieve the input profile of the intended recipient, and determine an input suggestion for the user based on the input profile, the location of the user, and the time the electronic message is input by the user. The server may then send the input suggestion to the user device for display.

Figure 5:
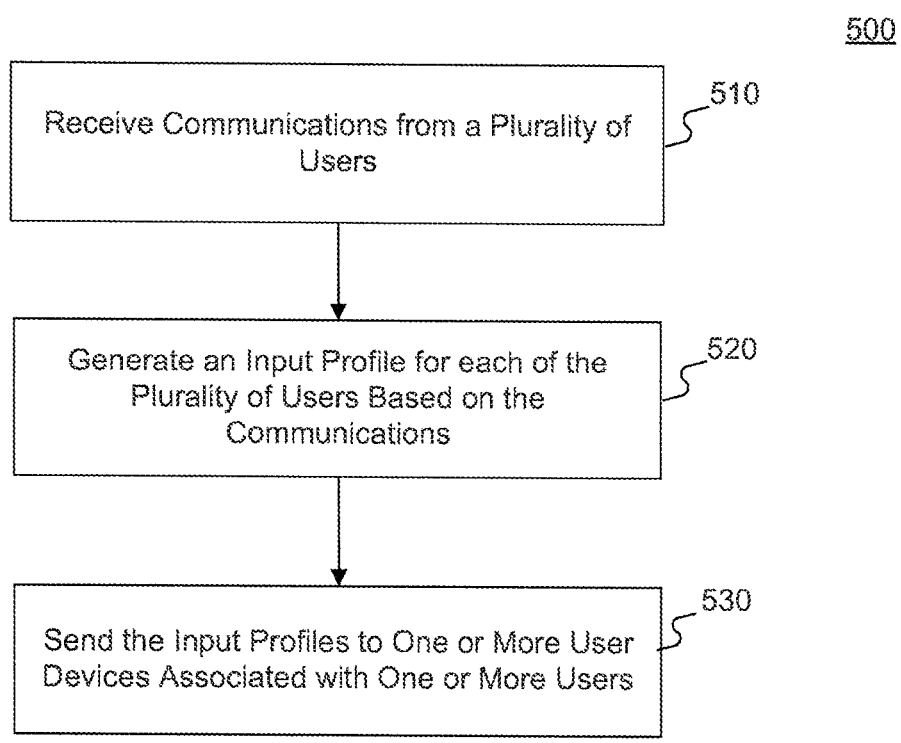
FIG. 5 is a flowchart of an example process for providing user input profiles, in accordance with embodiments of the present disclosure.

FIG. 5 is a flowchart of an example process 500 for providing user input profiles, in accordance with embodiments of the present disclosure. The steps associated with this example process may be performed by, for example, a processor of the communication server 150 of FIG. 1.

In step 510, the communication server receives communications from a plurality of users. For example, the communications may include electronic messages, emails, files shared, audio or video content sent by the users.

In step 520, the communication server generates an input profile for each of the plurality of users based on the communications. For example, the communication server may analyze the communications from the users and generate a wordbook that includes words used by the users in the communications. For example, the communication server may analyze communication between the user and the intended recipient as well as communication between the user and parties not involved in the current conversation to create the input profile of the user. The communication server may also analyze the uses' roles and the relationship between the users based on the contents of communications. The communication server may continue to update the input profile periodically based on the communications occurring during the most recent time period.

In step 530, the communication server sends the input profiles to one or more user devices associated with one or more users. For example, the communication server may send the input profiles to the plurality of users and update the input profiles periodically. As another example, the communication server may distribute the input profiles to a user device dynamically when the user composes an electronic message. The communication server may receive a request for some or all of the input profiles from a user device associated with a user, and in response to the request, the communication server may send the requested input profiles to the user device.

In some implementations, some of the steps described in the example process 500 may be implemented by a user device associated with a user, such as the user device 120 of FIG. 1. For example, a part or all of the communications may be stored in one or more of the user devices 120, and one or more of the user devices 120A-120E may perform functions such as generating user input profiles and sending the input profiles to other user devices or to the communication server. As another example, the user device may generate an input profile for an intended recipient based on past communications between the user and the intended recipient. The user device may send the input profile for the intended recipient to the communication server or share the input profile with other user devices.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A computer-implemented method for providing an input suggestion for a user, comprising:
   receiving one or more words input by the user in a body of an electronic message;
   incorporating the input suggestion into the electronic message based on whether the user indicates acceptance of the input suggestion, wherein the input suggestion suggests one or more changes to the one or more words input by the user; and
   sending, to a user device associated with an intended recipient, the one or more words input by the user and the electronic message that incorporates the input suggestion.

2. The computer-implemented method of claim 1, further comprising:
   identifying a relationship between the intended recipient and the user; and
   determining the input suggestion for the user further based on the relationship.

3. The computer-implemented method of claim 1, further comprising:
   identifying an application used by the user to input the electronic message; and
   determining the input suggestion for the user further based on the application.

4. The computer-implemented method of claim 1, further comprising:
identifying a prior electronic message received from the intended recipient; and
determining the input suggestion for the user further based on the prior electronic message.

5. The computer-implemented method of claim 1, wherein an input profile of the intended recipient indicates a vocabulary preferable to the intended recipient.

6. The computer-implemented method of claim 1, further comprising:
determining a plurality of weights corresponding to an input profile of the intended recipient, a location, and a time, respectively; and
determining the input suggestion for the user based on the input profile of the intended recipient, the location, the time, and the plurality of weights.

7. The computer-implemented method of claim 1, further comprising:
identifying a location associated with the intended recipient; and
determining the input suggestion for the user further based on the location associated with the intended recipient.

8. The computer-implemented method of claim 1, further comprising:
generating an input profile of the intended recipient based on communications between the user and the intended recipient.

9. A user device for providing an input suggestion for the user, comprising:
a display; and
at least one processor configured to:
receive one or more words input by the user in a body of an electronic message;
incorporate the input suggestion into the electronic message based on whether the user indicates acceptance of the input suggestion, wherein the input suggestion suggests one or more changes to the one or more words input by the user; and
send, to a user device associated with an intended recipient, the one or more words input by the user and the electronic message that incorporates the input suggestion.

10. The user device of claim 9, wherein the at least one processor is further configured to:
identify a relationship between the intended recipient and the user; and
determine the input suggestion for the user further based on the relationship.

11. The user device of claim 9, wherein the at least one processor is further configured to:
identify an application used by the user to input the electronic message; and
determine the input suggestion for the user further based on the application.

12. The user device of claim 9, wherein the at least one processor is further configured to:
identify a prior electronic message received from the intended recipient; and
determine the input suggestion for the user further based on the prior electronic message.

13. The user device of claim 9, wherein an input profile of the intended recipient indicates a vocabulary preferable to the intended recipient.

14. The user device of claim 9, wherein the at least one processor is further configured to:
determine a plurality of weights corresponding to an input profile of the intended recipient, a location, and a time, respectively; and
determine the input suggestion for the user based on the input profile of the intended recipient, the location, the time, and the plurality of weights.

15. The user device of claim 9, wherein the at least one processor is further configured to:
identify a location associated with the intended recipient; and
determine the input suggestion for the user further based on the location associated with the intended recipient.

16. A non-transitory, computer-readable medium that stores a set of instructions that is executable by at least one processor of a user device to cause the user device to perform a method for providing an input suggestion for a user, the method comprising:
receiving one or more words input by the user in a body of an electronic message;
incorporating the input suggestion into the electronic message based on whether the user indicates acceptance of the input suggestion, wherein the input suggestion suggests one or more changes to the one or more words input by the user; and
sending, to a user device associated with an intended recipient, the one or more words input by the user and the electronic message that incorporates the input suggestion.

17. The non-transitory, computer-readable medium of claim 16, wherein the method further comprises:
identifying an application used by the user to input the electronic message; and
determining the input suggestion for the user further based on the application.

18. The non-transitory, computer-readable medium of claim 16, wherein the method further comprises:
generating an input profile of the intended recipient based on communications between the user and the intended recipient.

19. The non-transitory, computer-readable medium of claim 18, wherein the method further comprises:
determining a plurality of weights corresponding to an input profile of the intended recipient, a location, and a time, respectively; and
determining the input suggestion for the user based on the input profile of the intended recipient, the location, the time, and the plurality of weights.

20. The non-transitory, computer-readable medium of claim 18, wherein an input profile of the intended recipient indicates a vocabulary preferable to the intended recipient.

* * * * *